Feb. 23, 1954
T. E. NELSON
2,669,878
PULLEY CONSTRUCTION
Filed Oct. 10, 1950
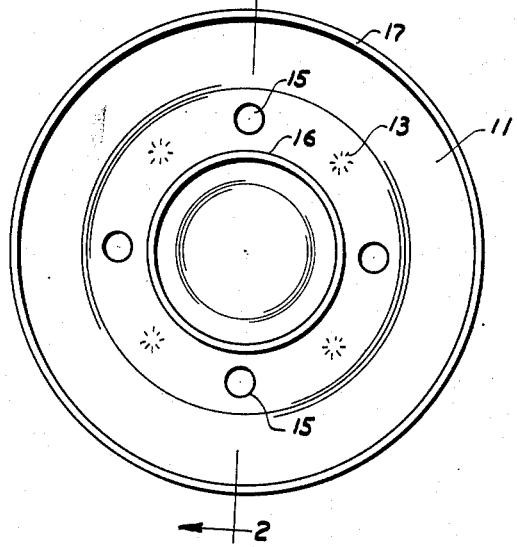
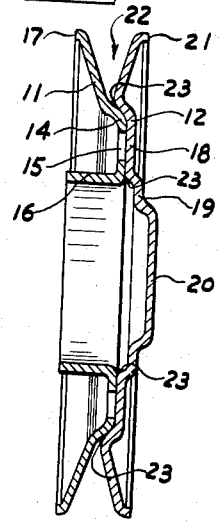
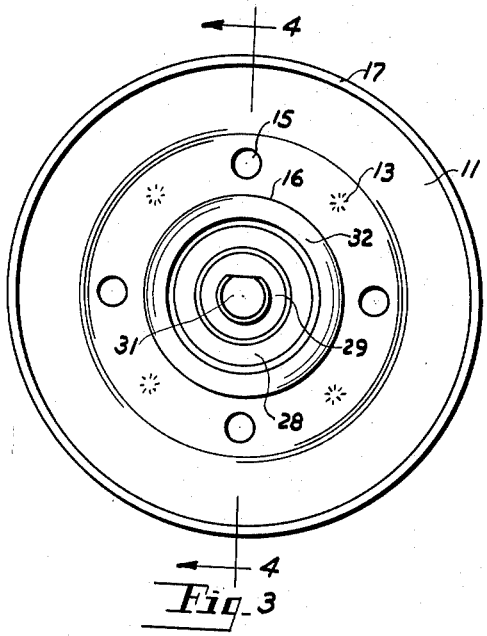
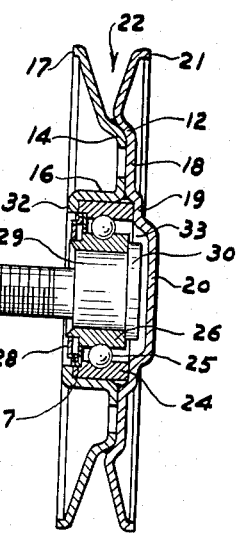
INVENTOR.
THOMAS EDWARD NELSON.
BY
Wisner & Sloman
ATTORNEYS Patented Feb. 23, 1954

2,669,878

UNITED STATES PATENT OFFICE 2,669,878

PULLEY CONSTRUCTION

Thomas Edward Nelson, Drayton Plains, Mich.

Application October 10, 1950, Serial No. 189,459

3 Claims. (Cl. 74—230.3)

This invention relates to a pulley construction together with the method of making the same, and more particularly to a novel pulley assembly and construction and an improved method of manufacture.

Heretofore in pulley constructions where the sheaves are separately formed and welded together and the bolt supporting bearing secured therein, there has been the difficulty and problem of completely and effectively sealing the bearing lubricant within the interior of the pulley. In many cases the seal between the contacting portions of the cooperating sheaves is incomplete or inefficient with the result that there is a centrifugal outward throwing of said lubricant from within the bearing housing of the pulley between the pulley sheaves.

It is the primary object of the present invention to provide a novel pulley construction together with a novel process of manufacture whereby there is a complete and fully effective seal created between the cooperating pulley sheaves with the result that there is no loss of lubricant from the interior of the pulley.

It is the further object of this invention to provide a very simple low cost pulley construction which is easy to manufacture, which is fully effective for its intended purpose and which will not throw lubricant.

These and other objects will be seen from the following specification and claims in conjunction with the accompanying drawing in which:

Fig. 1 is a front elevational view of the partially assembled pulley with the bearing structure omitted.

Fig. 2 is a section on line 2—2 of Fig. 1.

Fig. 3 is a front elevational view of the completely assembled pulley; and

Fig. 4 is a section on line 4—4 of Fig. 3.

It will be understood that the above drawing illustrates merely a preferred embodiment of the invention and that other embodiments are contemplated within the scope of the claims hereafter set out.

Referring to the drawing the pulley includes a pair of stamped formed circular pulley sheaves 11 and 12 which after forming are pressed together in alignment and are spot welded at the spaced points 13 as shown in Fig. 1 to provide a unitary pulley structure.

The sheave 11 includes the annular flat portion 14 which includes a plurality of punched openings 15, with the inner portion of the member 14 bent outwardly to form the sleeve 16 to receive the bolt and bearing assembly hereafter described. The sheave 11 also includes an outwardly inclined annular flange whose outer portion is turned outwardly as at 17 to provide a reinforcement for said flange which makes up one side of the V notch 22 to receive the pulley belt.

The sheave 12 includes a flat annular portion 18 adapted for cooperative surface registry with the corresponding flat annular portion 14 of sheave 11, and also includes the central circular hub 20 and the outturned annular circular portion 19 against which the bearing assembly seats when fully assembled as illustrated in Fig. 4.

The sheave 12 similarly includes an outer angular flange which forms the opposite side of the V notch 22, with the outer end of said flange being outturned at 21 to provide a reinforcement for said annular flange.

The pulley sheaves 11 and 12 after stamping and forming to the shape shown in Fig. 2 are brought together with their surfaces 14 and 18 in close registry under pressure, and said sheaves are secured to each other by the aforementioned spot welds 13. As a next step in the manufacturing process small preferably copper brazing slugs are loosely positioned within the openings 15 and the assembly shown in Fig. 2 is conveyed in a horizontal position with sheave 11 facing upwardly, into a brazing oven which is maintained approximately 2000 degrees F. and there is provided a hydrogen atmosphere within the oven. After brazing has been completed the assembly is conveyed out of the oven and cooled, and there has been formed an annular braze 23 between the pulley sheaves to effectively seal the annular space therebetween in the manner illustrated in Fig. 2. The braze also provides a thin film of material between the mating registering surfaces 14 and 18 so as to effectively seal the same together. The braze consists of a copper steel alloy and is fully effective for not only sealing said sheaves together but in further securing the same together.

The pulley assembly of Fig. 2 is now ready for the insertion therein of the bolt and bearing assembly. The bearing assembly includes a stationary race 24, the balls 25 and the rotary race 26 which is snugly pressed within the sleeve 16 to engage the inner surface of the annular portion 19 of sheave 12, after which the outer circular edge of said sleeve is turned over as at 32 to further retain the bearing assembly within the pulley housing. The bearing assembly, previously lubricated, includes an annular sealing ring 27 and the annular seal 28 secured thereto and which cooperatively engages the movable race 26 for effectively sealing the interior of said bearing assembly against the escape of its lubricant.

Before the bearing is positioned within the sleeve 16 there is pressed therethrough the bolt 29 having an annular shoulder 30 of increased diameter which engages the outer portion of the race 26. The outwardly projecting threaded shank 31 for said bolt provides the means of mounting said pulley upon a vehicle engine or upon any other desired support. By this construction is it apparent that the outer race 24 is tight with respect to the pulley assembly and therefore is free to rotate with respect to the inner race 26 which is tight upon the bolt 29. It will be noted that the hub 20 of sheave 12 provides an annular space 33 which receives the annular shoulder 30 of the bolt whereby the latter is spaced from the aforesaid hub.

By the above construction and process it is apparent that the two sheaves 11 and 12 are assembled and spot welded at 13 and brazed at the various points 23 after which the bearing and bolt assembly is pressed into place within the sleeve of one of the pulley sheaves, the outer portion of which is bent or formed over the bearing for securing the same within the sleeve to thus complete the pulley assembly.

Having described my invention reference should now be had to the claims which follow for determining the scope thereof.

I claim:

1. In a pulley construction, a formed disc having a flat annular portion and an outwardly inclined annular flange, a second formed disc having a central outwardly directed annular sleeve adapted to receive and support a bearing assembly, an intermediate flat annular portion, and an outwardly inclined annular flange cooperable with said first flange defining an annular V-shaped groove therebetween, the flat portions of said discs being in surface registry with each other and welded together by continuous interior and outer concentric welds of circular shape for completely sealing off the space between said discs.

2. In a pulley construction, a formed disc having a flat annular portion and an outwardly inclined annular flange, a second formed disc having a central outwardly directed annular sleeve, an intermediate flat annular portion, and an outwardly inclined annular flange cooperable with said first flange defining an annular V-shaped groove therebetween, the flat portions of said discs being in surface registry with each other and welded together, a bearing assembly containing a lubricant secured within said sleeve, a mounting bolt journaled within and projecting outwardly from said assembly, and concentric inner and outer annular copper alloy brazes interposed between and bonded to said corresponding flat surfaces for sealing the space between said discs for preventing centrifugal discharge of lubricant from said bearing assembly.

3. In a pulley construction, a formed disc having a flat annular portion and an outwardly inclined annular flange, a second formed disc having a central outwardly directed annular sleeve, an intermediate flat annular portion, and an outwardly inclined annular flange cooperable with said first flange defining an annular V-shaped groove therebetween, the flat portions of said discs being in surface registry with each other and welded together, a bearing assembly containing a lubricant secured within said sleeve, a mounting bolt journaled within and projecting outwardly from said assembly, and an annular copper alloy braze interposed between and bonded to said corresponding flat surfaces for sealing the space between said discs for preventing centrifugal discharge of lubricant from said bearing assembly, the outer edge of said sleeve being annularly turned inwardly for immovably retaining said bearing assembly.

THOMAS EDWARD NELSON.

References Cited in the file of this patent

UNITED STATES PATENTS

| Number | Name | Date |
|---|---|---|
| 856,634 | Hansen | June 11, 1907 |
| 859,099 | Nice, Jr. | July 2, 1907 |
| 904,540 | Lachman | Nov. 24, 1908 |
| 1,501,129 | Meiselbach | July 15, 1924 |
| 1,602,630 | White | Oct. 12, 1926 |
| 1,804,237 | Steenstrup | May 5, 1931 |
| 2,315,357 | Smith | Mar. 30, 1943 |
| 2,392,492 | Morgan et al. | Jan. 8, 1946 |